(12) United States Patent
Lee (10) Patent No.: US 7,690,620 B2
(45) Date of Patent: Apr. 6, 2010

(54) HEIGHT ADJUSTING DEVICE OF A DISPLAY DEVICE AND STAND FOR DISPLAY DEVICE

(75) Inventor: Moon Hee Lee, Goomi-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 11/483,544

(22) Filed: Jul. 11, 2006

(65) Prior Publication Data
US 2007/0096001 A1    May 3, 2007

(30) Foreign Application Priority Data
Nov. 2, 2005   (KR) ...................... 10-2005-0104424

(51) Int. Cl.
*F16M 3/00*    (2006.01)
(52) U.S. Cl. ................. 248/676; 248/125.2; 248/176.3; 248/297.11; 248/920
(58) Field of Classification Search ................. 248/655, 248/676, 656, 125.1, 125.2, 176.3, 176.1, 248/917, 919, 920, 922, 923, 297.11; 361/681–683
See application file for complete search history.

(56) References Cited

U.S. PATENT DOCUMENTS

| 6,702,238 | B1 * | 3/2004 | Wang ...................... 248/125.8 |
| 6,712,321 | B1 * | 3/2004 | Su et al. ................. 248/123.11 |
| 6,918,564 | B2 * | 7/2005 | Yen et al. .................... 248/404 |
| 6,938,869 | B2 * | 9/2005 | Lin et al. .................... 248/414 |
| 6,994,303 | B2 * | 2/2006 | Lin et al. ................. 248/122.1 |
| 7,036,787 | B1 * | 5/2006 | Lin ............................. 248/676 |
| 7,124,984 | B2 * | 10/2006 | Yokouchi et al. ......... 248/125.8 |
| 2004/0011932 | A1 | 1/2004 | Duff ............................ 248/157 |
| 2005/0092872 | A1 | 5/2005 | Lin et al. ................. 248/122.1 |
| 2005/0184215 | A1 * | 8/2005 | Lin ............................. 248/676 |
| 2005/0270732 | A1 * | 12/2005 | Titzler et al. ................ 361/681 |
| 2007/0097610 | A1 * | 5/2007 | Lee ............................. 361/681 |
| 2007/0152125 | A1 * | 7/2007 | Lee ............................. 248/398 |

FOREIGN PATENT DOCUMENTS

EP    1 577 601  B1    3/2008

OTHER PUBLICATIONS

European Search Report dated Dec. 3, 2007.

* cited by examiner

*Primary Examiner*—Korie Chan
(74) *Attorney, Agent, or Firm*—Ked & Associates LLP (57) ABSTRACT

A height adjusting structure for a stand of a display device is provided. The stand includes a guide rail, base, supporting unit, and guide unit. The guide rail is fixedly installed to a rear surface of the display device. The base is supported on a horizontal surface. The supporting unit extends upward from the base. The guide unit is fixedly installed on the supporting unit, to be guided and moved along the guide rail. The height adjusting structure uses a minimum number of parts, is easy to assemble, is highly resistant to external shocks, is able to securely support a display device, operates quieter, and has improved operating reliability.

22 Claims, 7 Drawing Sheets

HEIGHT ADJUSTING DEVICE OF A DISPLAY DEVICE AND STAND FOR DISPLAY DEVICE

BACKGROUND OF THE INVENTION

1. Field of the Invention

The present invention relates to a height adjusting device for a display device, and more particularly, to a height adjusting device for a display device that allows height adjustment of the display device using a simple configuration, and to a stand for a display device having the same.

2. Description of the Related Art

A display device according to the related art uses a stand to rest on a flat surface. Here, the stand supporting the display device has an adjusting structure that allows the display device to be moved up and down or pivoted to the left and right, depending on the user's requirements.

Height adjusting structures for display devices according to the related art employ a hinge assembly coupled to the rear of the display device allowing pivoting of the display device, a sliding assembly connected to the hinge assembly, and a sliding assembly height adjusting unit formed on a supporting unit for moving the sliding assembly up and down.

However, this height adjusting structure is formed of metal and uses screws to join the structure, and is therefore susceptible to damage incurred from external collisions and has a complex assembly structure.

Also, in the above metal height adjusting structure, a separate component is required to cover the sliding assembly and the height adjusting unit, so that more components and a higher manufacturing cost are needed.

Another problem with the above height adjusting structure using many components and metal ingredients is that it takes up a lot of space.

Also, the height adjusting unit that adjusts the height of the display device in the above height adjusting structure is formed on a supporting unit erected on a base unit of the stand, so that the center of gravity of the main body of the display is disposed forward of the center of the supporting unit. Thus, the stand is unstable due to the weight of the display device.

SUMMARY OF THE INVENTION

Accordingly, the present invention is directed to a height adjusting structure and a stand for a display device that substantially obviates one or more problems due to limitations and disadvantages of the related art.

An object of the present invention is to provide a height adjusting structure and a stand for a display device that uses a minimum number of components and a simple configuration.

Another object of the present invention is to provide a height adjusting structure and a stand for a display device that does not use screws for fasteners and is therefore highly resistant to external shocks.

A further object of the present invention is to provide a height adjusting structure and a stand for a display device that puts the center of gravity of the display device close to the supporting unit, for a more secure height adjusting structure and stand for a display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device, including: a guide rail fixedly installed to a rear surface of the display device; a base supported on a horizontal surface; a supporting unit extending upward from the base; and a guide unit fixedly installed on the supporting unit, for being guided and moving along the guide rail.

In another aspect of the present invention, there is provided a height adjusting structure for a display device, including: a display device; a vertical moving assembly formed on a rear surface of the display device, for adjusting a height of the display device; a supporting unit connected to the vertical moving assembly, for supporting the display device; and a base disposed at a lower portion of the supporting unit, wherein the vertical moving assembly includes: a rear surface fixing unit fixed to the rear surface of the display device; a spring fixed at an end thereof to the rear surface fixing unit; a guide unit coupled to the supporting unit, for contacting an other end of the spring and contracting and expanding the spring during the adjusting of the height of the display device; and a guide rail disposed behind the rear surface fixing unit, for guiding the guide unit.

In a further aspect of the present invention, there is provided a height adjusting structure for a display device, including: a display device; a vertical moving assembly formed on a rear surface of the display device, for adjusting a height of the display device; a supporting unit coupled to the vertical moving assembly, for supporting the display device in an upward direction; and a base disposed at a lower portion of the supporting unit, wherein the vertical moving assembly includes: a coil-type spring fixed at an end thereof to the rear surface of the display device; and a guide unit connected to the supporting unit at one end thereof and to an other end of the spring at an other end of the guide unit, for expanding and contracting the spring when the height of the display device is adjusted.

In a still further aspect of the present invention, there is provided a stand for a display device, including: a guide rail fixedly installed on a display device; a guide unit guided by the guide rail and moving in one path; a base contacting a horizontal surface; a supporting unit extending upward from the base and coupled to the guide unit at an upper portion thereof; and an elastic member interposed between the display device and the supporting unit, for imparting a force to push the display device upward.

By being configured as in the above, a height adjusting structure for a display device has fewer components and a simpler configuration. Also, the center of gravity of the display device formed on the height adjusting structure is closer to the supporting unit, so that the display device can be more securely supported.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
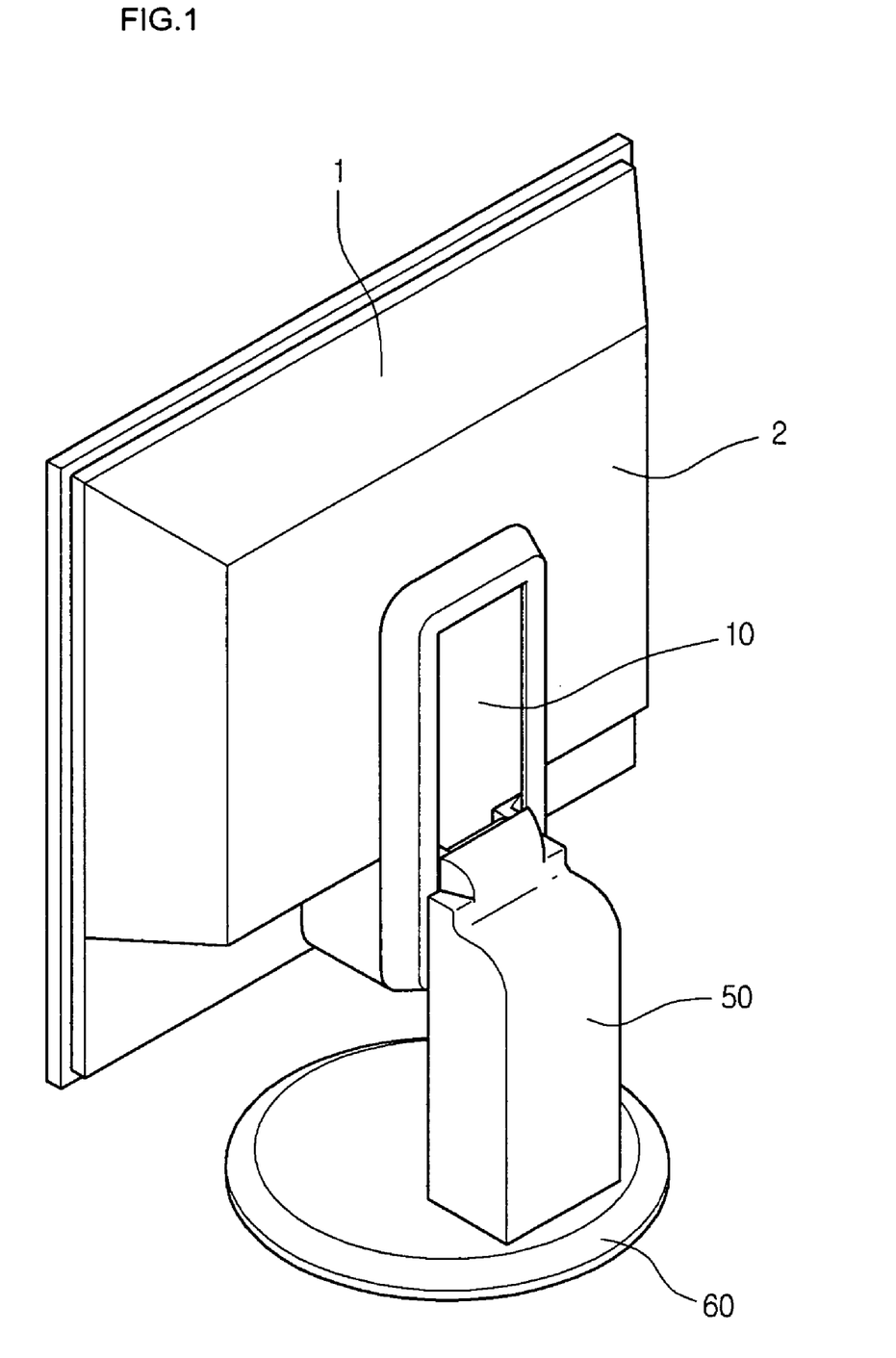
FIG. 1 is a perspective view of a stand using a height adjusting structure for a display device according to present invention.
Figure 2:
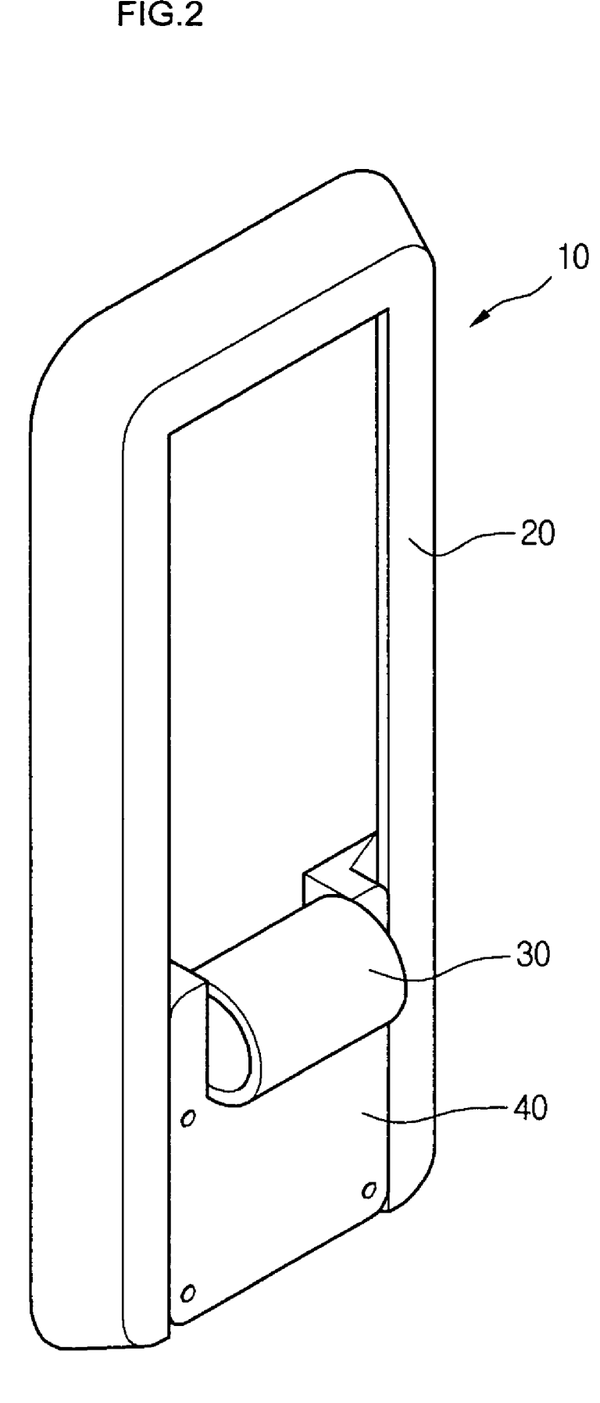
FIG. 2 is a perspective view of a vertical moving assembly and a supporting unit of a height adjusting structure for a display device according to the present invention.

FIG. 1 is a perspective view of a stand using a height adjusting structure for a display device according to present invention, and FIG. 2 is a perspective view of a vertical moving assembly and a supporting unit of a height adjusting structure for a display device according to the present invention.

Referring to FIG. 1, the height adjusting structure for a display device according to the present invention includes a vertical moving assembly 10 fixed to a rear surface 2 of the display device 1, a supporting unit 50 for supporting the vertical moving assembly 10, and a base unit 60 for resting on a horizontal surface and supporting the supporting unit 50 on the horizontal surface.

Here, when referring to FIG. 2, the vertical moving assembly 10 includes a guide rail 20 fixed in a vertical direction to the lower portion of the rear surface 2, a guide unit 40 moving in a vertical direction within the guide rail 20, and a plate spring 30 formed between the guide rail 20 and guide unit 40, that expands and contracts according to the movement of the guide unit 40.

The outer side of the guide unit is fixed to the upper portion of the supporting unit 50.

Here, the guide rail 20 and the guide unit 40 may be formed of a plastic material.

The operation of the above-configured height adjusting structure will be described in the following.

When a user wishes to move the display device 1 in a vertical direction, the main body of the display device 1 is moved vertically. Here, the guide unit 40 fixed to the supporting unit 50 moves along the guide rail 20.

When the guide unit 40 moves, the plate spring 30 located at the top of the guide unit 40 is either elongated or contracted by the guide unit 40.

Here, when the vertical movement of the display device 1 is ceased, the guide unit 40 stops moving, and the expanding or contracting plate spring 30 stops moving as a result.

The plate spring 30 provides elasticity for supporting the weight of the display device 1 at the position that the plate spring 30 stops moving, so that the cessation of movement of the plate spring 30 stops the movement of the display device 1. The plate spring 30 may be provided with a spiral spring having a portion fixed to the display device and other portion coming in contact with the guide unit 40, so that the spiral spring may be expanded or contracted by a movement of the guide unit 40.

Thus, in this way, the display device 1 may be moved up and down.

Here, the height adjusting structure of the display device 1 according to the present invention has the vertical moving assembly 10 fixed to the rear surface 2 thereof.

The guide rail 20 of the vertical moving assembly 10 is fixed to the rear surface 2 of the display device 1, and the guide unit 40 moving along the guide rail 20 is fixed to the supporting unit 50. Accordingly, the center of gravity of the main body of the display device 1 is formed in proximity to the supporting unit 50. Therefore the stability preventing from the falling of the display device can be enhanced.

Also, the height adjusting structure for the display device according to the present invention is formed of plastic, so that the height adjusting structure itself forms the outer structure of the display device, negating the need for a separate component for covering the height adjusting structure.

Thus, when compared to a height adjusting structure for a display device according to the related art, a fewer number of components can be used.

Below, the structure of the supporting unit supporting the vertical moving assembly will be described in detail with reference to the drawings.

Figure 3:
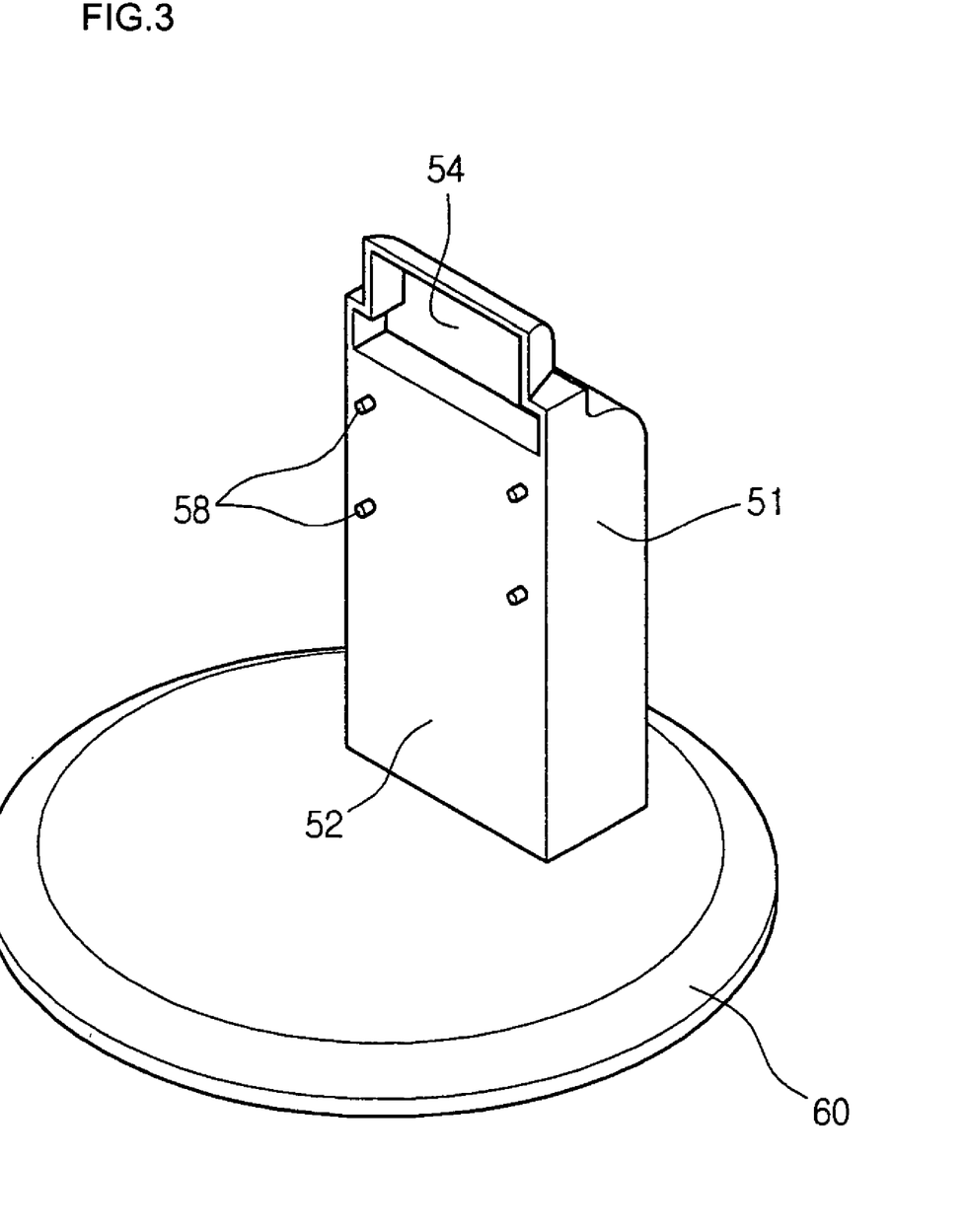
FIG. 3 is a perspective view showing an inner surface of a supporting unit for supporting a height adjusting structure according to the present invention.

FIG. 3 is a perspective view showing an inner surface of a supporting unit for supporting a height adjusting structure according to the present embodiment.

Referring to FIG. 3, the supporting unit 50 includes a supporting stand 51 fixed to the base unit 60 resting on a horizontal surface, for supporting the display device 1 on the horizontal surface.

A spring receptacle 54 is formed at the upper portion of the supporting stand 51, in which the top of the plate spring 30 protrudes outward from the vertical moving assembly 10, is disposed.

One or more coupling protrusion(s) 58 are formed below the spring receptacle 54 for fastening the outer surface of the guide unit 40 on the supporting unit 50. The coupling protrusions 58 are coupled to coupling holes 49 (in FIG. 5) formed in the outer surface of the guide unit 40, so that the supporting stand 51 is coupled to the guide unit 40. Accordingly, the supporting unit 50 is connected to the vertical moving assembly 10 without using separate screws or other fasteners.

The supporting unit 50 is formed to be fixed to the guide unit 40 of the vertical moving assembly 10 formed on the rear surface 2 of the display device 1, so that the guide unit 40 can move along the guide rail 20 when the display device 1 is moved vertically.

The above supporting unit 50 may include a hinge unit at its top end that not only allows the display device to be moved vertically, but to also be pivoted upward and downward.

Figure 4:
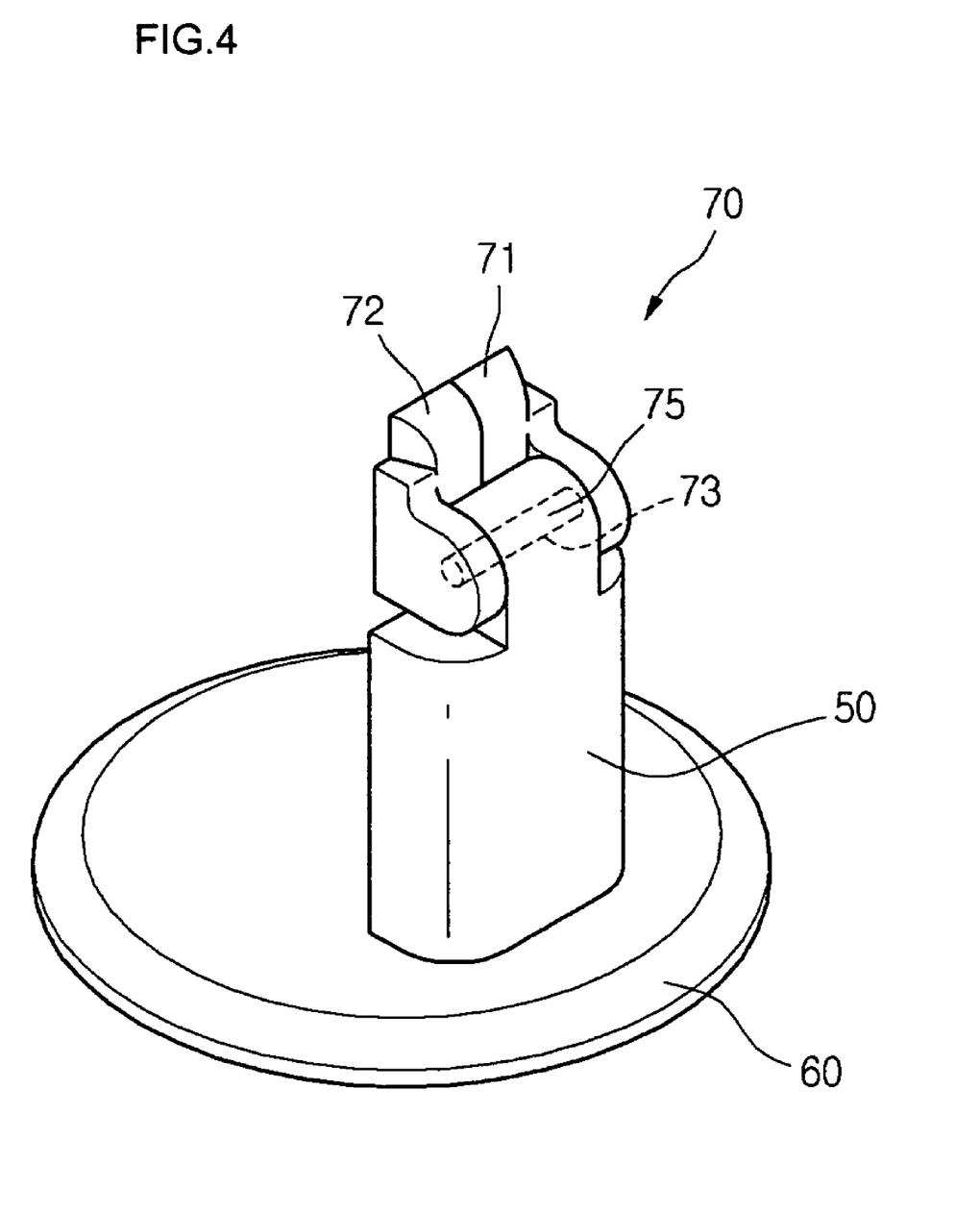
FIG. 4 is a perspective view of an alternate embodiment of a supporting unit of a stand for a height adjusting structure of a display device according to an embodiment of the present invention.

FIG. 4 shows another embodiment of the supporting unit 50 with such a hinge unit formed thereon.

Referring to FIG. 4, a hinge unit 70 is provided at the top of the supporting unit 50. The hinge unit 70 has pivoting members 71 and 72 and a pivoting center portion 75.

In further detail, a pair of pivoting members 71 and 72 is pivotably installed on the outer surface of the guide unit 40.

The guide unit 40 is fixed to one side of the pivoting members 71 and 72, and a hinge axis 73 is coupled with the other side thereof. Accordingly, the pivoting members 71 and 72 are formed to pivot around the pivoting center portion 75 formed at above the supporting stand 51. The display device 1, fixed to a side of the pivoting members 71 and 72, can be pivoted up and down around the central pivoting center portion 75.

By forming the hinge unit 70 above the supporting unit 50 and coupling the height adjusting structure for the display device according to the present invention to a side of the hinge unit 70, the stand of the display device can be adjusted in height and tilted up and down.

In the above embodiment, a supporting unit with a hinge unit that pivots up and down has been described. However, the supporting unit may be formed to be capable of pivoting to the left and right as well as up and down.

A description of the above vertical moving assembly coupled to the supporting unit will now be provided in more detail.

Figure 5:
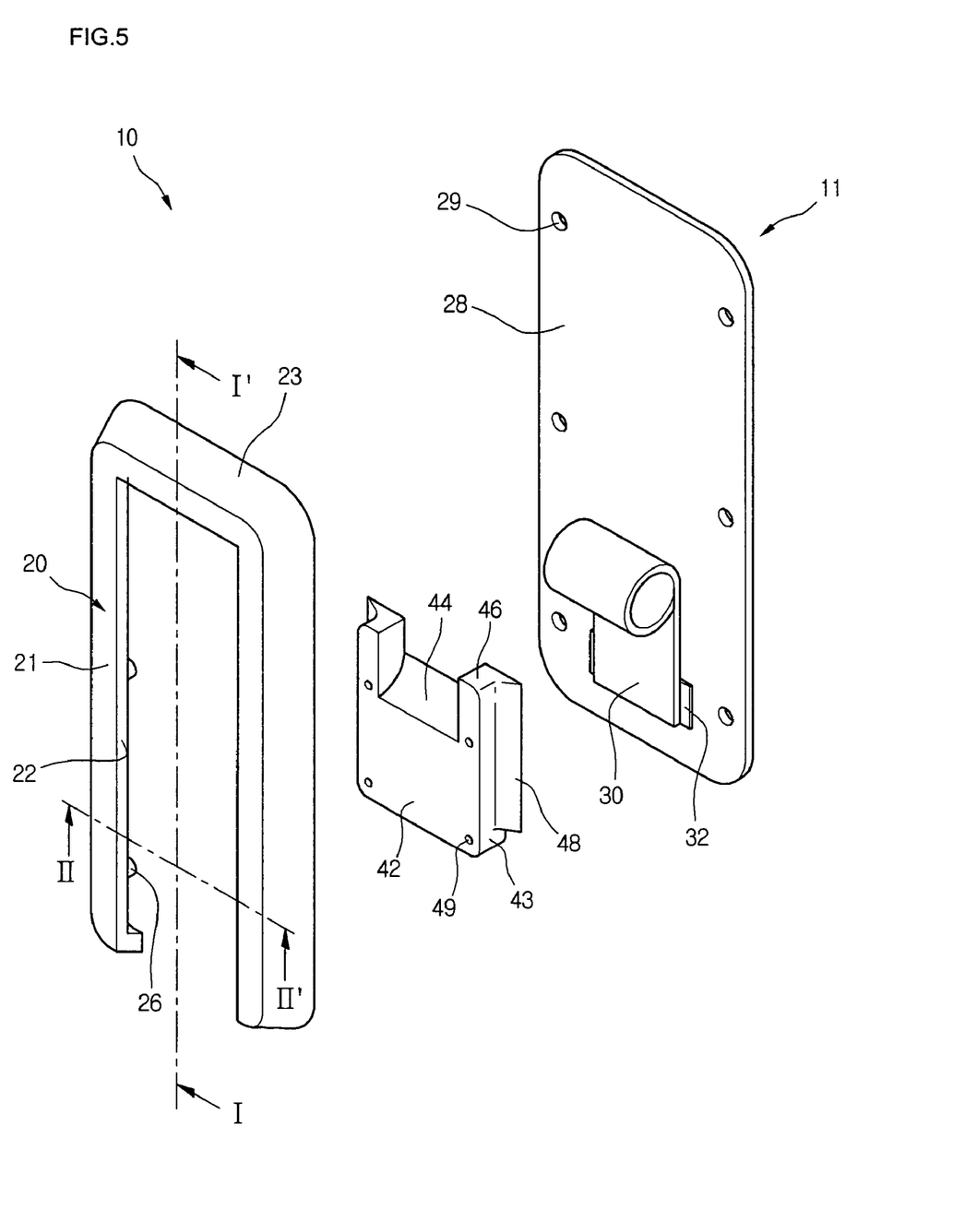
FIG. 5 is an exploded perspective view of a vertical moving assembly of a height adjusting structure according to the present invention.
Figure 6:
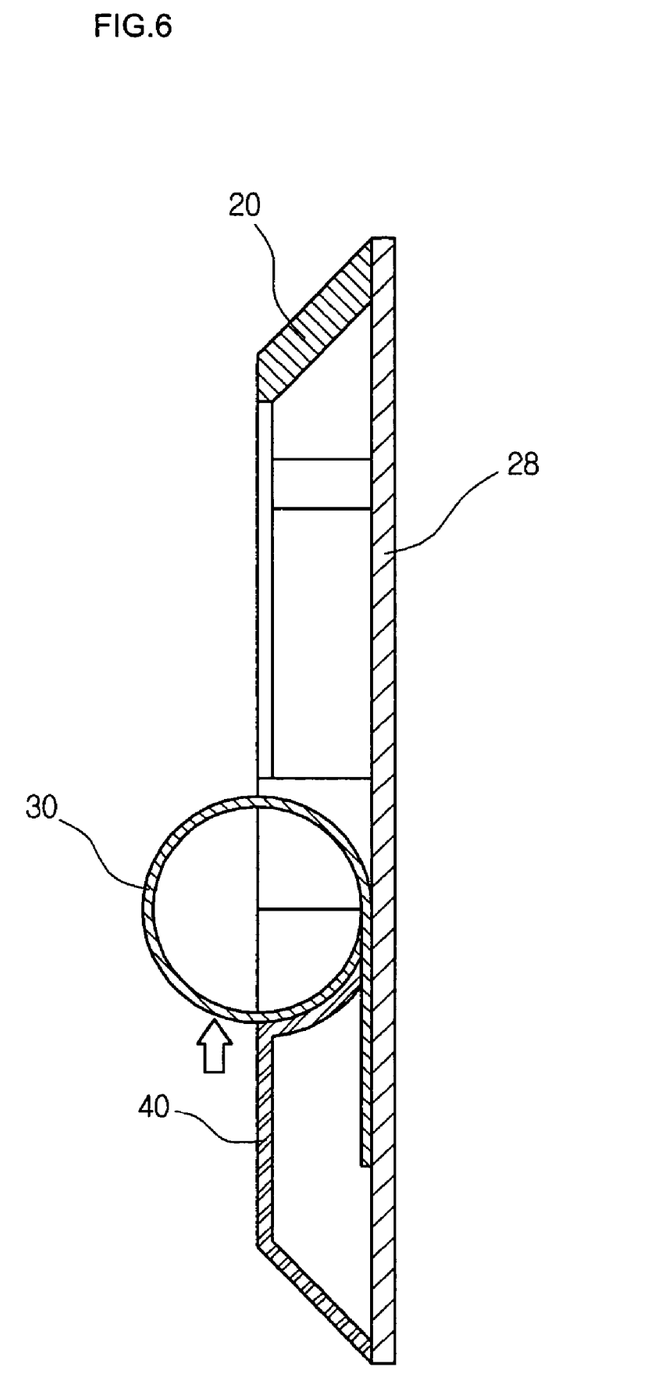
FIG. 6 is a sectional view of the vertical moving assembly in FIG. 5 in an assembled state, taken along line I-I'.
Figure 7:
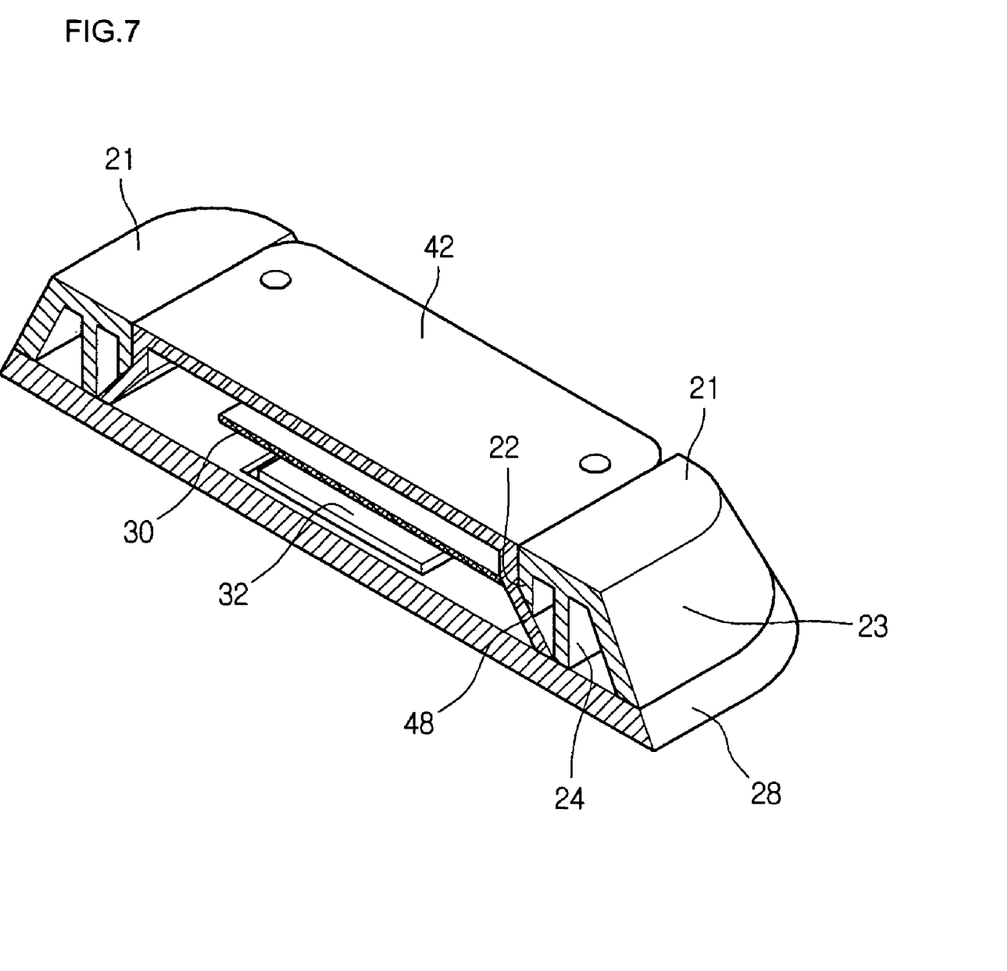
FIG. 7 is a perspective view of the vertical moving assembly in FIG. 5 in an assembled state, taken along line II-II'.

FIG. 5 is an exploded perspective view of a vertical moving assembly 10 of a height adjusting structure according to the present invention, FIG. 6 is a sectional view of the vertical moving assembly 10 in FIG. 5 in an assembled state, taken along line I-I', and FIG. 7 is a perspective view of the vertical moving assembly 10 in FIG. 5 in an assembled state, taken along line II-II'.

Referring to FIG. 5, the height adjusting structure according to the present invention includes a guide rail 20 formed vertically along the rear surface 2 of the display device 1 and a guide unit body 42 that moves vertically within and along the guide rail 20.

The guide rail 20 is coupled to a rear surface fixing unit 11 fixed to the rear surface 2 of the display device 1, and is thus fixed to the rear surface 2 of the display device 1.

Here, an elastic member 30 is fixed to the inner surface of the rear surface fixing unit 11. In this embodiment, the elastic member used is a plate spring 30, for example spiral spring. The plate spring is positioned to be expanded and contracted by the guide unit body 42.

In further detail, the guide rail 20 includes a pair of rails 21 disposed vertically on the rear surface 2 of the display device 1 and an upper section 23 formed at the top of the rails 21 for restricting the upper limit of the guide rail.

The lower end of the guide rail 20 is open. Because the guide rail 20 is closed at the top and open at the bottom, it forms an inverted 'u' shape. The reason for the open bottom end is to provide space for some portion of the guide unit to reside.

Each of the pair of rails 21 has a guide surface 22 on its inner side that contacts the side surfaces of the guide unit 40 and is vertically disposed against the rear surface 2 of the display device 1.

The guide surfaces 22 of the guide rail 20, which are provided in a parallel pair of mutually facing inner surfaces of the guide rail 20, contact the sides of the guide unit so that the guide unit can move along the guide surfaces 22.

Referring to FIG. 7, the lower portion at the rear of the guide surface 22 does not contact the rear surface fixing unit 11, but is spaced a predetermined distance therefrom.

Inclined surfaces 48 having a predetermined incline are formed on the sides of the guide unit body 42 between the lower end of the guide surface 22 and the rear surface fixing unit 11, for helping to guide the guide unit body 42 along the guide rail 20.

A rail support 24 (refer to FIG. 7) is formed parallel to the inclined surface within the guide rail 20. The guide rail support 24 acts as a skeleton for supporting the rails 21 when the rails 21 are made of plastic.

The width between the rails 21 is wider at the portion contacting the rear surface than at the top, recessing outward towards the bottom, as shown in FIG. 7. This is so that the rails 21 form an outer portion of the display device 1 in order to refine the outer appearance of the rails 21.

Coupling protrusions 26 are formed along the length of the guide rail 20 on the inner surface of the rails 21. These coupling protrusions 26 couple to guide rail fastening holes 29 formed on the rear surface fixing unit 11, to fix the guide rail 20 to the rear surface fixing unit 11.

The rear surface fixing unit 11 is a component that fixes to the rear surface 2 of the display device 1, and is shaped in rectangular plate configuration. A plurality of fastening holes 29 are formed in the inner side of the rear surface fixing unit 11, for coupling with the coupling protrusions 26 of the rails 21.

A side of the plate spring 30 is fixed to a spring mount 32 at the lower inner portion of the rear surface fixing unit 11.

As an element for fixing a side of the plate spring 30 to the rear surface fixing unit 11, the spring mount 32 may be formed of an adhesive or other bonding material. Also, the spring mount 32 may take any other form as a structure that is able to fix one side of the plate spring to the rear surface fixing unit.

The rear surface fixing unit may be omitted from the present invention. That is, the plate spring and guide rail may all be directly fixed to the rear surface of the display device.

However, when such a rear surface is separately formed, the vertical moving assembly can be formed as a single operating component, so that it can be fixed to a variety of rear surface shapes of display devices.

The plate spring 30, that is the elastic member used in the present invention, is a spiral spring that is wound. When the display device is raised, the wound spring is unwound; and when the display device is lowered, the wound spring is recoiled. Different from a tension spring that imparts elastic force when stretched, the plate spring imparts a constant elastic force whatever its position.

One end of the plate spring 30 is fixed to the inner surface of the guide rail 20, and the other end extends along the guide rail 20.

The elasticity of the extending plate spring is used to support the weight of the display device, so that the plate spring exerts the same elasticity for supporting the display device, regardless of the spring's extended position. Therefore, a separate stopping device is not required for the plate spring to come to a rest at whatever height the display device is positioned. A spring operating in this way can be called a coil-type plate spring.

An alternate elastic member that performs the same function as the plate spring may be substituted for the plate spring.

In order to extend the plate spring 30 with the above structure, a guide unit 40 is disposed within the guide rail 20 for moving vertically along the guide rail 20.

The guide unit 40 includes a spring guide 46 extending upward from either side of the guide unit body 42, and an inclined surface 48 protruding outward from either side of the guide unit body 42 at a slant and disposed within the guide rail 20.

The guide unit 40 moves up and down along the guide rail 20, and acts as a pusher that pushes and extends the plate spring 30 disposed below it.

The upper portion of the spring body, as shown in FIG. 6, has a convex-shaped spring pushing portion 44 formed thereon to contact and push the lower portion of the plate spring 30 upward.

The spring pushing portion 44 may be formed in the same width as the plate spring 30 or have a wider width.

A pair of spring guides 46 extends upward from the guide unit body 42 on either side of the spring pushing portion 44.

The plate spring 30 is disposed between the pair of spring guides 46. The protruding length of the spring guides 46 may be roughly equal to the diameter of the plate spring 30. The spring guides 46 guide the sides of the plate spring 30 during compression and expansion of the plate spring 30.

The inclined surface 48 is formed on either side of the guide unit body 42. The inclined surface 48 protrude in a decline from the centers of the side portions downward.

Referring to FIG. 7, the side surfaces 43 of the guide unit body 42 contacts the guide surfaces 22 of the guide rail 20.

The inclined surfaces 48 at the bottom portions of the side surfaces 43 are located below the guide surfaces 22 of the guide rail 20. Therefore, when the guide rail 20 is erected in an upright position, and the guide unit body 42 moves vertically along the guide rail 20, the guide unit body 42 is prevented from being displaced outside the guide rail 20.

When the guide unit body 42 is located at the lower portion of the guide rail 20, the lower portions of the guide surfaces 48 are formed to catch on the inside of the guide rail 20. Thus, when the guide unit body 42 is installed in the rails 21, it is prevented from escaping out from the rails 21.

Coupling holes 49 are formed on the outer, upper surface of the guide unit body 42 to couple with coupling protrusions 58.

The coupling protrusions 58 on the supporting unit 50 are inserted and coupled in the coupling holes 49, in order to couple the guide unit body 42 to the supporting unit 50.

As described above, in order to adjust the height of the display device with the vertical moving assembly according to the present invention, plastic rails and a plastic guide unit, and a plate spring fixed between the guide rail and the guide unit make up a minimum of components. By using plastic, noise caused by the plate spring contacting the guide unit can be reduced, and noise of the overall structure is reduced during its operation, while its operation is reliably performed.

Also, assembly of the rails and the guide unit does not require separate screws, and is easily performed by coupling the plastic protrusions and holes.

Additionally, because screws are not used, even when shaking caused by externally-inflicted shocks occurs, there is not danger of screws unloosening and causing vibration within the structure.

The operation of the vertical moving assembly will now be described.

The height adjusting structure according to the present invention has the display device 1 at its highest position when the guide unit body 42 is disposed at the lower portion of the rails 21.

Here, when a user wishes to adjust the height of the display device 1, the body of the display device 1 is pushed downward.

When the body of the display device 1 is pushed downward, the guide unit body 42 fixed above the supporting unit 50 moves up along the guide rail 20, as shown in FIG. 6.

When the guide unit body 42 moves up along the guide rail 20, the guide unit body 42 pushes the plate spring 30 upward. As the plate spring 30 is pushes upward, the guide unit body 42 rises, and the display device 1 body descends.

Here, when the user ceases pushing the body of the display device 1 downward, the display device 1 comes to a standstill at the position where it was released.

This is because in this position, the elasticity of the plate spring 30 providing force for supporting the display device 1 is equal to the weight of the display device 1, so that equilibrium is achieved. By achieving equilibrium in this state, the height of the display device 1 can be fixed. Of course, friction between the respective components also plays a role in stopping movement.

Thus, the height of the display device can be adjusted in a range corresponding to the height of the guide rail installed on the display device.

The above height adjusting structure for a display device according to the present invention allows a simple assembly using few components.

Also, the height adjusting structure for a display device according to the present invention does not use screws as fasteners, so that the structure is more resistant to external shocks.

Additionally, because the stand according to the present invention puts the center of gravity of the display device close to the supporting unit, the display device can be more securely supported.

Furthermore, because the respective components forming the height adjusting structure are made of plastic, noise during operation of the structure is reduced and operational reliability is increased.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device, comprising:
an elastic member configured to be fixed at one end thereof to a rear surface of the display device;
a guide rail disposed vertically on the rear surface of the display device;
a base supported on a supporting surface;
a supporting unit extending upward from the base;
a guide unit, connected to the supporting unit and contacting another end of the elastic member, for contracting and expanding the elastic member while a height of the display device is adjusted, wherein the guide unit is guided by the guide rail in a vertical direction that corresponds to an extending direction of the guide rail,
wherein the guide unit comprises:
a guide body;
an inclined surface protruding from a side of the guide body with a predetermined slant and disposed between the guide rail and a rear surface of the display device; and
wherein the guide rail comprises a guide surface configured to contact the inclined surface of the guide unit, the guide rail supporting the guide surface with respect to the rear surface of the display device to restrict motion of the guide unit in a direction perpendicular to the extending direction of the guide rail.

2. The stand according to claim 1, wherein the elastic member is a plate spring.

3. The stand according to claim 1, wherein the elastic member is expanded and contracted with a side of the guide unit contacting the elastic member.

4. The stand according to claim 1, wherein the elastic member is a coil-type plate spring.

5. The stand according to claim 1, wherein the guide rail includes rails formed on inner sides thereof, along which the guide unit slides.

6. The stand according to claim 1, wherein the guide rail is made of a plastic material.

7. The stand according to claim 1, wherein the guide unit is made of a plastic material.

8. The stand according to claim 1, wherein the guide rail extends in a vertical direction for adjusting a height of the display device.

9. The stand according to claim 1, wherein at least one of the guide rail or the guide unit or the support unit is made of a plastic material.

10. The stand according to claim 1, wherein the elastic member is configured to impart a force to move the display device upward.

11. The stand according to claim 10, wherein the elastic member is a spiral spring.

12. The stand according to claim 1, wherein the guide unit further comprises:
a spring pushing portion having a convex shape and a curvature corresponding to a curvature of the other end of the elastic member that is wound, and configured to contact the other end of the elastic member; and
a spring guide extending upward from at least one side of the spring pushing portion.

13. The stand according to claim 1, further comprising:
a hinge unit, interposed between the supporting unit and the guide unit, to allow the display device to pivot.

14. The stand according to claim 1, wherein the inclined surface and the guide surface are complementary surfaces having substantially a same slant angle.

15. The stand according to claim 1, wherein the guide unit includes a pair of inclined surfaces that protrude from opposing sides of the guide body, the inclined surfaces extending in opposing directions at substantially a same angle.

16. The stand according to claim 15, further comprising:
a pair of guide rails that contact and have complementary surfaces relative to respective ones of the inclined surfaces.

17. The stand according to claim 16, wherein the elastic member is a wound spring.

18. The stand according to claim 17, wherein the guide unit includes a curved surface between and at least substantially perpendicular to the pair of inclined surfaces, the curved surface conforming to a shape of the spring and causing the spring to unwind with movement of the guide unit relative to the guide rails.

19. A height adjusting device for a display device, comprising:
a vertical moving assembly formed on a rear surface of the display device, for adjusting a height of the display device;
a supporting unit connected to the vertical moving assembly, for supporting the display device; and
a base disposed at a lower portion of the supporting unit, wherein the vertical moving assembly includes:
a rear surface fixing unit formed in a plate shape with respect to a rear surface of the display device, and fixed to the rear surface of the display device;
an elastic member fixed at an end thereof to the rear surface fixing unit;
a guide unit coupled to the supporting unit, for contacting an other end of the elastic member and contracting and expanding the elastic member during the adjusting of the height of the display device;
a guide rail vertically, disposed on the rear surface fixing unit, for guiding the guide unit in a vertical direction relative to the rear surface fixing unit, wherein the vertical direction corresponds to an extending direction of the guide rail; and
a hinge unit interposed between the supporting unit and the guide unit, for enabling a pivoting of the display device, wherein the guide unit comprises:
a guide body;
an inclined surface protruding from a side of the guide body with a predetermined slant and disposed between the guide rail and a rear surface of the display device; and
wherein the guide rail comprises a guide surface configured to contact the inclined surface of the guide unit, the guide rail supporting the guide surface with respect to the rear surface of the display device to restrict motion of the guide unit in a direction perpendicular to the extending direction of the guide rail.

20. The height adjusting device according to claim 19, wherein the elastic member is a coil-type plate spring.

21. The height adjusting device according to claim 19, wherein the elastic member expands when the height of the display device is low, and the elastic member contracts when the height of the display device is high.

22. A height adjusting device for a display device, comprising:
a vertical moving assembly, vertically disposed on a rear surface of the display device, for adjusting a height of the display device in a vertical direction relative to the rear surface of the display device;
a supporting unit coupled to the vertical moving assembly, for supporting the display device in an upward direction; and
a base disposed at a lower portion of the supporting unit, wherein the vertical moving assembly includes:
a coil-type spring including an end fixedly installed on the display device and another end moving variably with the vertical moving assembly;
a guide unit, fixed to the supporting unit at one end thereof and in contact with an other end of the spring at an other end of the guide unit, for expanding and contracting the spring when the height of the display device is adjusted,
a guide rail, vertically disposed on a rear surface fixing unit on the rear surface of the display device, to guide the guide unit in a vertical direction, wherein the vertical direction corresponds to an extending direction of the guide rail,
wherein the guide unit comprises:
a guide body;
an inclined surface protruding from a side of the guide body with a predetermined slant and disposed between the guide rail and the rear surface of the display device,
a spring pushing portion convex in shape and with a curvature corresponding to a curvature of the other end of the coil-type spring that is wound, the spring pushing portion configured to contact the other end of the coil-type spring; and
a spring guide extending upward from at least one side of the spring pushing portion, wherein the guide rail comprises a guide surface configured to contact the inclined surface, the guide rail supporting the guide surface with respect to the rear surface of the display device to restrict motion of the guide unit in a direction perpendicular to the extending direction of the guide rail.

* * * * *